April 11, 1939.  S. E. FAUGHT  2,153,534
GAUGE FOR SETTING PRINTING PRESS CYLINDERS
Filed March 30, 1938
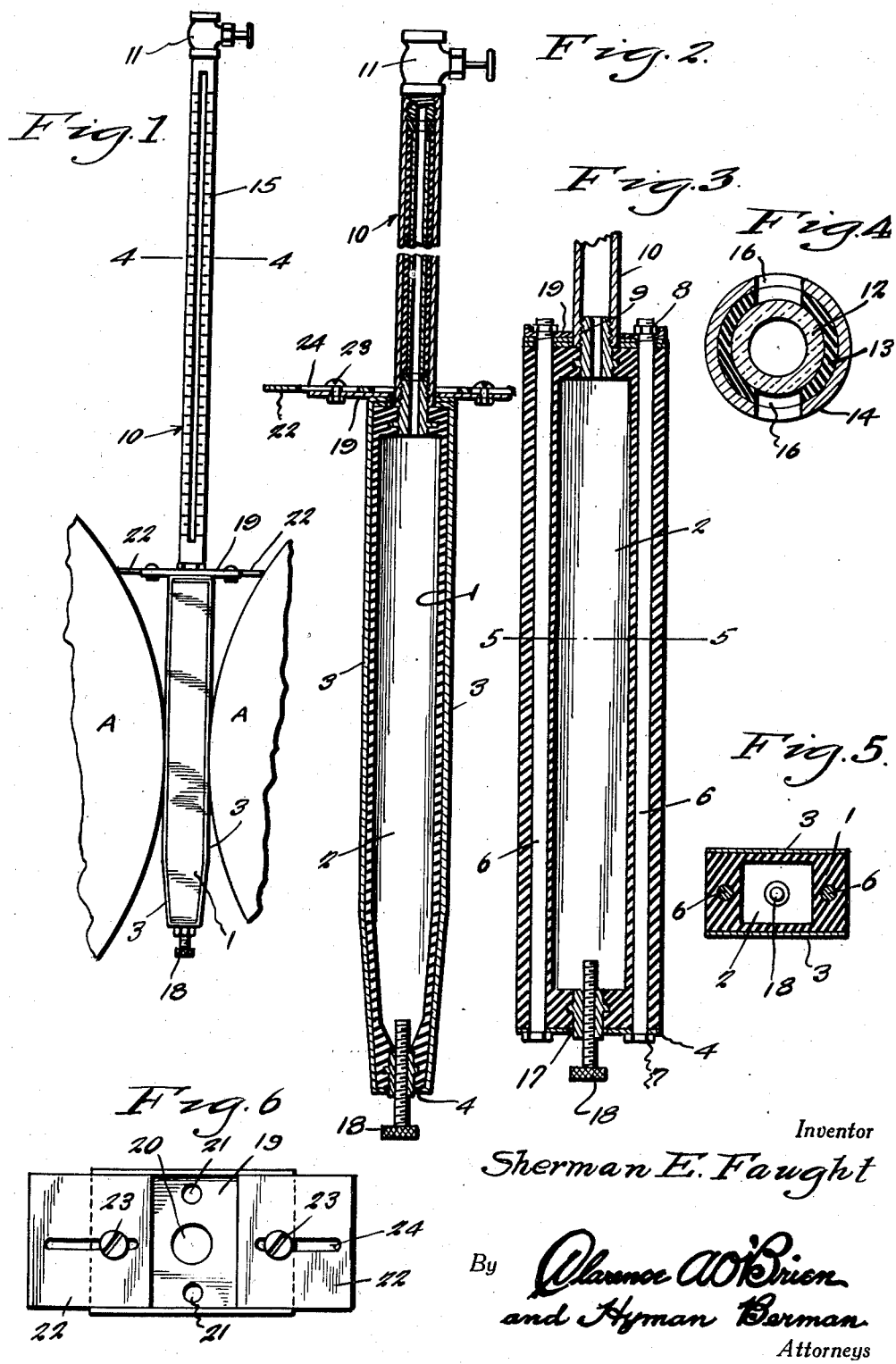
Inventor
Sherman E. Faught
By Clarence A. O'Brien
and Hyman Berman
Attorneys Patented Apr. 11, 1939

2,153,534

UNITED STATES PATENT OFFICE 2,153,534

GAUGE FOR SETTING PRINTING PRESS CYLINDERS

Sherman E. Faught, New Orleans, La.

Application March 30, 1938, Serial No. 199,046

4 Claims. (Cl. 33—181)

This invention relates to a gauge for setting the blanket and plate cylinders of a printing press, the general object of the invention being to provide a resilient member having a liquid containing chamber therein, a sight gauge in communication with the chamber so that when the member is compressed by relative movement of two cylinders between which the member is placed some of the liquid will be forced into the sight gauge to accurately indicate the distance between the cylinders.

Another object of the invention is to provide adjustable means for regulating the distance the member is inserted between the cylinders and to place the flexible member between walls of flexible metal which are engaged by the cylinders.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is an elevational view showing the device in use as measuring the space between a pair of cylinders.

Figure 2 is a longitudinal sectional view through the device.

Figure 3 is a longitudinal sectional view through the body of the device, the section being taken at right angles to that shown in Figure 2.

Figure 4 is a section on the line 4—4 of Figure 1.

Figure 5 is a section on the line 5—5 of Figure 3.

Figure 6 is a top plan view of the means for regulating the extent of insertion of the device between a pair of cylinders.

In this drawing the numeral 1 indicates an elongated member of rubber or the like and of substantially rectangular shape in cross section and which is provided with a longitudinally extending elongated chamber 2 of rectangular shape. Flexible metal plates 3 are vulcanized to the sides of the member 1 and the ends of these metal plates are bent over the upper end of the member 1 and overlap, the lower ends of the plates being connected together by a bight portion 4. Rods 6 pass through the material of the member 1 adjacent the ends thereof and through the end portions of the plates 3 and have heads or nuts 7 at the lower ends engaging the part 4 and nuts 8 at their upper ends for holding the ends of the plates on the bolts. Thus these rods or bolts hold the parts in assembled relation and the lower end of the assemblage tapers slightly downwardly as shown to facilitate placing the device between the cylinders A of a printing press as shown in Figure 1, with the metal plates engaging portions of the cylinders. A coupling 9 is embedded in the upper end of the member 1 and communicates the lower end of a sight gauge shown generally at 10 with the chamber 2 and a valve 11 is connected with the upper end of the sight gauge to permit air to escape from the gauge when the same is in use. This sight gauge can be of any suitable form though it is shown as including an inner transparent tube 12, a sleeve 13 of rubber or the like and an outer casing 14 of metal or any other suitable material, the scale marks 15 being located on this casing 14 adjacent the slots 16 in said casing 14 and sleeve 13, these slots of course permitting portions of the transparent tube to be seen so that the liquid level can be observed.

A bushing 17 is embedded in the bottom of the member 1 and a screw 18 is threaded therein for adjusting the liquid level with respect to the zero mark of the sight gauge.

In order to regulate the distance the body of the device is inserted between two cylinders I provide a channel-shaped member 19 which is formed with the opening 20 therein for the passage of the casing 14 and the holes 21 for the passage of the rods or bolts 6 and a pair of plates 22 project from the ends of the channel-shaped member and are adjustably held therein by the screws 23 carried by the channel-shaped member and passes through the slots 24 in the plates. The outer ends of these plates 22 will engage portions of the cylinders A as shown in Figure 1 and thus limit the downward movement of the body of the device between the cylinders and by adjusting the plates 22 the extent of insertion of the body of the device between the cylinders can be regulated and these adjustable supporting means permit the device to be properly arranged between cylinders of different types and sizes.

In using the device, the body thereof is placed between the two cylinders, the plates 22 being properly adjusted to limit the downward movement of the body of the device between the cylinders and the compression of the body by the cylinders will force some of the liquid from the chamber 2 into the sight gauge and thus the distance between the cylinders can be accurately determined. When the device is being used the valve 11 is open to permit the escape of air displaced by the rise of liquid and when the device is not in use the valve should be closed to prevent loss of liquid. By adjusting the screw 18 the level of the liquid can be set at zero on the scale 15 before placing the device in use.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:—

1. A gauge for measuring the distance between a pair of rollers or cylinders comprising an elongated body of resilient material and having a chamber therein containing liquid, a sight gauge connected with one end of the body for receiving some of the liquid therefrom when the body is compressed and flexible metal plates connected with the sides of the body for contacting the cylinders.

2. A setting gauge for a pair of cylinders comprising an elongated body of resilient material adapted to be inserted between the cylinders, said body having a chamber therein containing liquid, a sight gauge connected with the upper end of the body for receiving some of the liquid therefrom when the body is compressed, a horizontal channel member connected with the upper end of the body, a pair of plates having portions slidably arranged in the channel of said member, one at each end thereof, said plates having slots therein extending longitudinally thereof and screws passing through the slots into the channel member for holding the plates in adjusted position, said plates acting to limit the extent of insertion of the body between the cylinders.

3. A setting gauge for a pair of cylinders comprising an elongated body of resilient material adapted to be inserted between the cylinders, said body having an elongated chamber therein containing liquid, the lower part of the body tapering downwardly, flexible metal plates connected with the sides of the body contacting the cylinders, said plates extending over the tapered portion of the body, a bushing embedded in each end of the body, a screw passing through the lower bushing for adjusting the liquid level in the body, a sight gauge connected with the upper bushing, said body and the chamber therein being of substantially rectangular shape in cross section.

4. A setting gauge for a pair of cylinders comprising an elongated body of resilient material adapted to be inserted between the cylinders, said body having an elongated chamber therein containing liquid, a sight gauge connected with the upper end of the body and in communication with the chamber, flexible metal plates extending along two opposing sides of the body and having their lower ends connected together at the lower end of the body and their upper ends bent over the upper end of the body and bolts passing longitudinally through the walls of the body and through the connected lower ends of the plates and through the bent over upper portions of the plates.

SHERMAN E. FAUGHT.